(12) United States Patent
BenHanokh et al.

(10) Patent No.: US 11,671,350 B1
(45) Date of Patent: Jun. 6, 2023

(54) DATA REQUEST SERVICING USING MULTIPLE PATHS OF SMART NETWORK INTERFACE CARDS

(71) Applicant: RED HAT, INC., Raleigh, NC (US)

(72) Inventors: Gabriel Zvi BenHanokh, Ra'anana (IL); Brett Douglas Niver, Westford, MA (US); Joshua Nikolai Durgin, Victoria (CA)

(73) Assignee: RED HAT, INC., Raieigh, NC (US)

( * ) Notice: Subject to any disclaimer, the term of this patent is extended or adjusted under 35 U.S.C. 154(b) by 0 days.

(21) Appl. No.: 17/888,108

(22) Filed: Aug. 15, 2022

(51) Int. Cl.
*H04L 45/24* (2022.01)
*H04L 67/1097* (2022.01)
*H04L 49/901* (2022.01)
*H04L 45/12* (2022.01)

(52) U.S. Cl.
CPC ............ *H04L 45/24* (2013.01); *H04L 45/123* (2013.01); *H04L 49/901* (2013.01); *H04L 67/1097* (2013.01)

(58) Field of Classification Search
CPC ..... H04L 45/24; H04L 45/123; H04L 49/901; H04L 67/1097
See application file for complete search history.

(56) References Cited

U.S. PATENT DOCUMENTS

| | | | |
|---|---|---|---|
| 6,389,479 B1 | 5/2002 | Boucher et al. | |
| 7,673,072 B2 | 3/2010 | Boucher et al. | |
| 10,409,511 B1* | 9/2019 | Subbarao | G06F 3/0656 |
| 10,592,447 B1* | 3/2020 | Danilov | G06F 13/20 |
| 10,936,516 B2 | 3/2021 | Danilov et al. | |
| 11,245,762 B1* | 2/2022 | BenHanokh | H04L 67/60 |
| 2004/0117596 A1* | 6/2004 | Henry | G06F 3/0683 711/219 |
| 2019/0372804 A1* | 12/2019 | Li | G06F 13/385 |
| 2020/0004701 A1* | 1/2020 | Subbarao | G11C 29/52 |
| 2020/0314011 A1* | 10/2020 | Deval | H04L 45/74591 |
| 2020/0351222 A1* | 11/2020 | Zakin | H04L 69/321 |

(Continued)

FOREIGN PATENT DOCUMENTS

| WO | WO-2022037266 A1 * | 2/2022 |
|---|---|---|
| WO | WO-2022052800 A1 * | 3/2022 |

OTHER PUBLICATIONS

Huang et al., "AcceISDP: A Reconfigurable Accelerator for Software Data Plane Based on FPGA SmartNIC," Electronics, vol. 10(16), Aug. 11, 2021: pp. 1-26, <https://doi.org/10.3390/electronics10161927>.

(Continued)

*Primary Examiner* — Shean Tokuta
(74) *Attorney, Agent, or Firm* — Kilpatrick Townsend & Stockton LLP

(57) ABSTRACT

Data requests can be serviced by multiple paths of smart network interface cards (NICs). For example, a system can receive a request for data at a first path of a smart NIC. The first path can be a hardware-implemented path. The system can send one or more parameters of the request to a second path of the smart NIC. The second path can be a slower path than the first path and configured to execute a routing algorithm for the request. The system can receive routing information for the request from the second path based on the routing algorithm and transmit the request to a storage node based on the routing information.

20 Claims, 3 Drawing Sheets

(56) References Cited

U.S. PATENT DOCUMENTS

| | | | |
|---|---|---|---|
| 2020/0409739 A1* | 12/2020 | Kamath | H04L 45/3065 |
| 2021/0026731 A1* | 1/2021 | Li | H04L 67/1097 |
| 2021/0092058 A1* | 3/2021 | Popilov | H04L 45/566 |
| 2021/0103403 A1* | 4/2021 | He | G06F 3/0664 |
| 2021/0144517 A1* | 5/2021 | Guim Bernat | H04L 9/0637 |
| 2021/0248124 A1* | 8/2021 | Tobin | G06F 12/0882 |
| 2022/0100491 A1 | 3/2022 | Voltz et al. | |
| 2022/0103478 A1 | 3/2022 | Ang et al. | |
| 2022/0334864 A1* | 10/2022 | K N | G06F 9/45558 |

OTHER PUBLICATIONS

Liu et al., "Offloading Distributed Applications onto Smart NICs using iPipe," SIGCOMM '19, Aug. 19-23, 2019: pp. 1-16.
Van Tu et al., "Accelerating Virtual Network Functions with Fast-Slow Path Architecture using eXpress Data Path," IEEE Transactions on Network and Service Management, vol. 17(3), Jun. 5, 2020: pp. 1474-1486.

* cited by examiner

US 11,671,350 B1

DATA REQUEST SERVICING USING MULTIPLE PATHS OF SMART NETWORK INTERFACE CARDS

TECHNICAL FIELD

The present disclosure relates generally to smart network interface cards (NICs). More specifically, but not by way of limitation, this disclosure relates to data request servicing using multiple paths of smart NICs.

BACKGROUND

Smart network interface cards (NICs) are devices capable of offloading processes from a host processor in a computing environment. For example, a smart NIC can perform network traffic processing that is typically performed by a central processing unit (CPU). Other processes the smart NIC can perform can include load balancing, encryption, network management, and network function virtualization. Offloading functionality to a smart NIC can allow the CPU to spend more time performing application processing operations, thereby improving performance of the computing environment.

DETAILED DESCRIPTION

Figure 1:
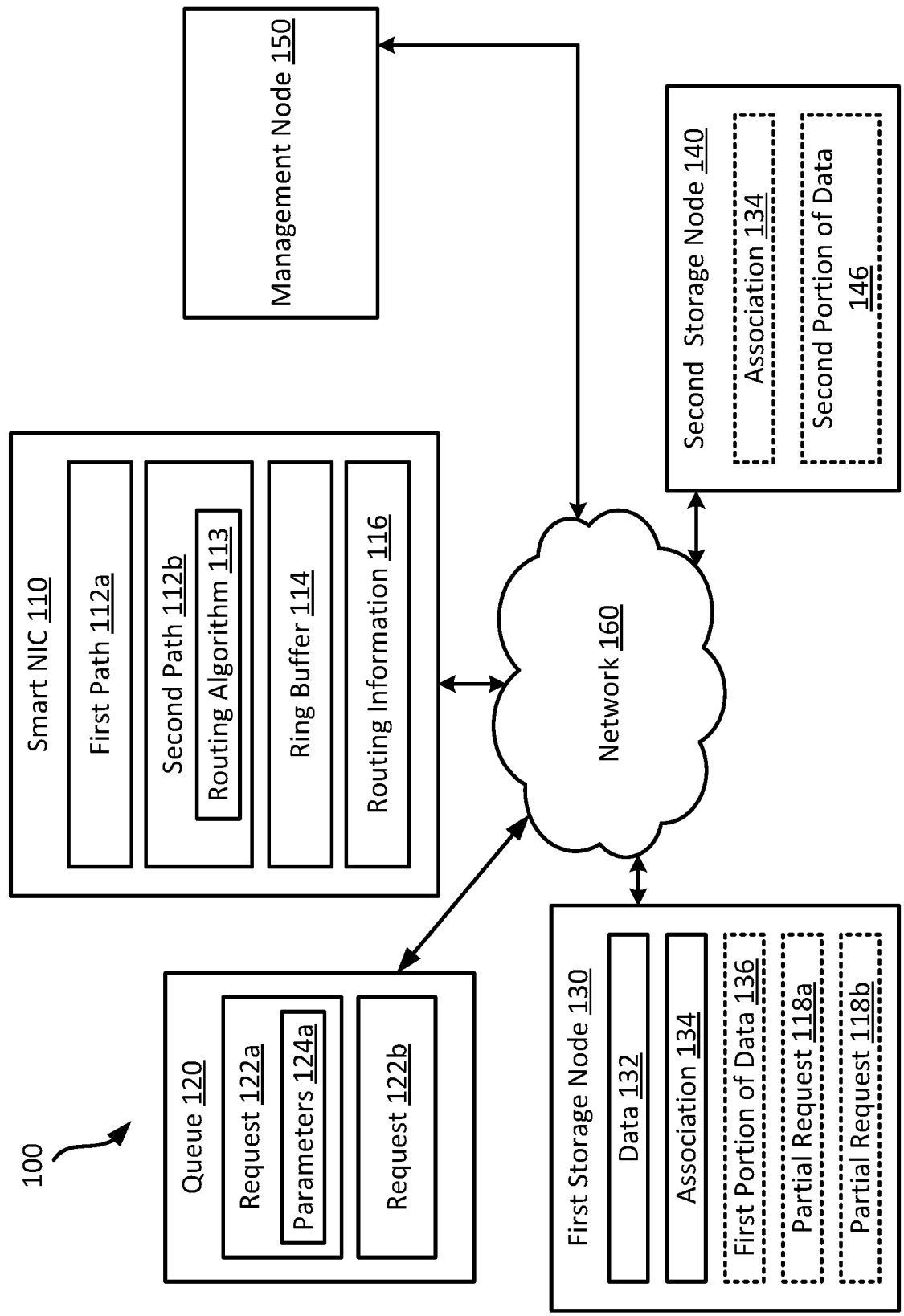
FIG. 1 is a block diagram of an example of a system for implementing data request servicing using multiple paths of smart network interface cards (NICs) according to some aspects of the present disclosure.

Smart network interface cards (NICs) can offload processes from a processor, such as transmitting data requests to storage nodes. A smart NIC may refer to a network interface card that is programmable. For example, a smart NIC can initially include unused computational resources that can be programmed for additional functionality. Smart NICs can include multiple paths for performing operations. One path of the smart NIC can be considered a fast path and can be a hardware-implemented path. The hardware may be a field-programmable gate array (FPGA) that can run dedicated simplified code that does not involve significant interaction with software. As a result, the hardware-implemented path may service input/output (I/O) requests quickly.

Another path can be considered a slow path that runs code on an embedded processor, such as an advanced reduced instruction set computer (RISC) machine (ARM). The second path can execute any type of code, but may be an order of magnitude slower than the hardware-implemented path. Smart NICs may use the second path, as opposed to the fast, hardware-implemented path, to service data requests since the slow path can interact with software to run more complex code. For instance, data may be sharded and distributed across multiple storage nodes of a system. Sharding code is often implemented at the application level, so the smart NIC has to interact with the applications to determine where to transmit the data requests. Since the fast path includes limited software interaction capabilities, sharding code may be too complex for the fast path, so the slow path may be used to service data requests. Virtualization code may also be too complex for the fast path. As a result, using a smart NIC to transmit data requests to storage nodes may be inefficient and time consuming.

Some examples of the present disclosure can overcome one or more of the abovementioned problems by providing a system that can use both paths of a smart NIC to improve data request servicing. For example, the system can receive a request for data at the first path of the smart NIC. The first path can be a hardware-implemented path. The system can send one or more parameters of the request to a second path of the smart NIC that is a slower path than the first path. The second path can execute a routing algorithm for the request. The routing algorithm can determine routing information for the request. The system can receive the routing information for the request at the first path from the second path based on the routing algorithm. The system can then transmit the request to the storage node based on the routing information. Since the second path executes the routing algorithm, the determination of the routing information can be accurate regardless of movement or other changes for the data because the second path can be aware of the changes. So, the using both the first path and the second path to service data requests can be efficient and accurate. In addition, the system can include a queue of requests that may allow the smart NIC to service requests in wirespeed with minimal latency.

For data that is sharded and distributed across multiple storage nodes of the system, the smart NIC may transmit the request to a storage node that includes a portion of the data. The smart NIC may not differentiate sharded data from data that is not sharded. Typically, requests do not cross node boundaries, so the smart NIC can transmit the full request to one storage node without splitting the request into partial requests and transmitting the partial requests to multiple storage nodes. The storage node can generate partial requests for the other portions of the data on other storage nodes and transmit the partial requests to the other storage nodes. Having the storage node handle the partial requests may minimize decision making in the hardware-implemented path and result in efficient servicing of data requests in a reduced amount of time, ultimately resulting in reduced usage of computing resources.

One particular example can involve system with a smart NIC and a storage node. The smart NIC can receive a write request for data at a hardware-implemented path. The hardware-implemented path can poll a queue and receive the write request from the queue. The hardware-implemented path can then determine parameters of a client device identifier, an offset, and a length, and the like associated with the write request. The hardware-implemented path can send the parameters to a slower path that executes a routing algorithm for the parameters to determine updated parameters for the data. The updated parameters can indicate a location in the storage node that is associated with the data. The slower path can send routing information with the updated parameters for the write request to the hardware-implemented path. The hardware-implemented path can then transmit the write request to the storage node based on the routing information. By using the slow path only to determine the routing information, time for retrieving data and servicing requests using smart NICs can be reduced.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing data request servicing using smart NICs according to some aspects of the present disclosure. The system 100 can include a smart NIC 110, a queue 120, a first storage node 130, a second storage node 140, and a management node 150. The first storage node 130 and the second storage node 140 can be physical servers for storing data. The smart NIC 110, the queue 120, the first storage node 130, the second storage node 140, and the management node 150 can communicate over a network 160, such as a local area network (LAN) or the Internet.

In some examples, the smart NIC 110 can include a first path 112a and a second path 112b. The first path 112a can be a hardware-implemented path that is capable of running simplified code to execute I/O requests quickly. The first path 112a can be used for passthrough I/O requests that involve limited interaction with software. The first path 112a may be implemented as a field-programmable gate array (FPGA). The second path 112b can be a slower path than the first path 112a that runs general purpose code on a weak embedded processor, such as an ARM.

The smart NIC 110 can receive requests 122 from the management node 150. The requests 122 can be requests for data stored in one or more storage nodes. For example, the requests 122 may be read or write requests that the management node 150 receives from a client device (not shown). The management node 150 can transmit the requests 122 to the first path 112a. In some examples, the management node 150 can send the requests 122 to a queue 120 and the first path 112a can receive the requests 122 from the queue 120.

The first path 112a can receive request 122a from the queue 120 for data 132. The request 122a can be associated with parameters 124a. Examples of the parameters 124a can include a device identifier for the client device that generated the request 122a, an offset for the data 132, a length for the data 132, and any other suitable parameters. Upon receiving the request 122a, the first path 112a can send the parameters 124a to the second path 112b. The first path 112a may send the parameters 124a to a ring buffer 114 that is accessible by the second path 112b, so the second path 112b can receive the parameters 124a from the ring buffer 114.

The second path 112b can execute a routing algorithm 113 for the request 122a based on the parameters 124a. For example, in Ceph® storage, the routing algorithm 113 may be a controlled replication under scalable hashing (CRUSH) algorithm. Other routing algorithms may be used in other storage systems. The routing algorithm 113 can determine a location in a storage node that is associated with the data 132. So, the routing algorithm 113 can determine routing information 116 for the request 122a. The routing information 116 can include updated parameters of the data 132 associated with the location in the storage node. For example, the routing information 116 can indicate an updated device identifier of the storage node for storing the data 132, an updated offset of the data 132, an updated length for the data 132, etc.

The second path 112b can send the routing information 116 to the first path 112a so that the first path 112a can transmit the request 122a for execution by the storage node indicated in the routing information 116. For example, the routing information 116 can indicate that the first storage node 130 is associate with the data 132. So, upon receiving the routing information 116 from the second path 112b, the first path 112a can transmit the request 122a to the first storage node 130. The first storage node 130 can then either read or write the data 132 based on the request 122a.

In some examples, data objects may be sharded across multiple storage nodes of the system 100. In other words, a data object may be fragmented into smaller pieces, and each piece can be stored on a different storage node. The data object may be fragmented across any number of storage nodes. In such examples, requests 122 for data may also be fragmented, and the fragmentation may happen at the smart NIC 110 or at a storage node.

To illustrate, the management node 150 can transmit the request 122a for data 132 to the first path 112a of the smart NIC 110. The first path 112a can determine, based on the routing information 116 received from the second path 112b, that the first storage node 130 includes at least a portion of the data 132, and transmit the request 122a to the first storage node 130. The routing information 116 may indicate each storage node that includes a portion of the data 132. For example, the smart NIC 110 can determine the first storage node 130 includes a first portion of the data 136 and the second storage node 140 includes a second portion of the data 146. The smart NIC 110 can transmit the request 122a to the first storage node 130 based on the routing information 116 indicating the first portion of the data 136 is stored in the first storage node 130. The smart NIC 110 may additionally transmit the request 122a to the second storage node 140 based on the routing information indicating the second portion of data 146 is stored in the second storage node 140. Alternatively, rather than transmitting the request 122a to the second storage node 140, the first path 112a may avoid further processing of the request 122a subsequent to transmitting the request 122a to the first storage node 130. For example, to minimize decision making at the first path 112a, the first path 112a may avoid transmitting the request 122a, or portions of the request 122a, to each storage node that includes a portion of the data. Instead, the first path 112a may only send the request 122a to a single storage node with a portion of the data.

Each storage node in the system 100 can maintain an association 134 between each storage node and data stored on each storage node. The management node 150 can automatically update the association 134 in real time when data is relocated or added to the system 100. So, upon the first storage node 130 receiving the request 122a, the first storage node 130 can determine that the first storage node 130 includes the first portion of the data 136 and the second storage node 140 includes the second portion of the data 146 based on the association 134. The first storage node 130 can then generate a first partial request 118a for the first portion of the data 136 and a second partial request 118b for the second portion of the data 146 from the request 122a. The first storage node 130 can retrieve the first portion of the data 136 based on the first partial request 118a. The first storage node 130 can also transmit the second partial request 118b to the second storage node 140 and the second storage node 140 can retrieve the second portion of the data 146 based on the second partial request 118b.

The first path 112a can work with two heads such that the first path 112a can perform a first operation for a first request while (e.g., substantially contemporaneously) performing a second operation for a second request. As an example, the request 122a can be a request received from the queue 120 after request 122b is received from the queue 120. So, while the first path 112a performs the first operation for the request 122a, the first path 112a can perform the second operation for the request 122b. The first operation can involve the first path 112a receiving the request 122a from the queue 120 and sending the parameters 124a of the request 122a to the second path 112b so that the second path 112b can determine the routing information 116 for the request 122a. The second operation can involve the first path 112a receiving the routing information 116b for the request 122b from the second path 112b, removing the request 122b from the queue 120, and executing the request 122b based on the routing information 116 by sending the request 122b to a storage node indicated in the routing information 116. Thus, the queue 120 can reduce a latency of routing requests since multiple requests can be processed simultaneously.

FIG. 1 is illustrative and non-limiting. Other examples may include more components, fewer components, different components, or a different arrangement of the components shown in FIG. 1. For example, although the system 100 includes two storage nodes in the example of FIG. 1, the system 100 may include a larger number of storage nodes in other examples. Data objects may be distributed across any number of the storage nodes.

Figure 2:
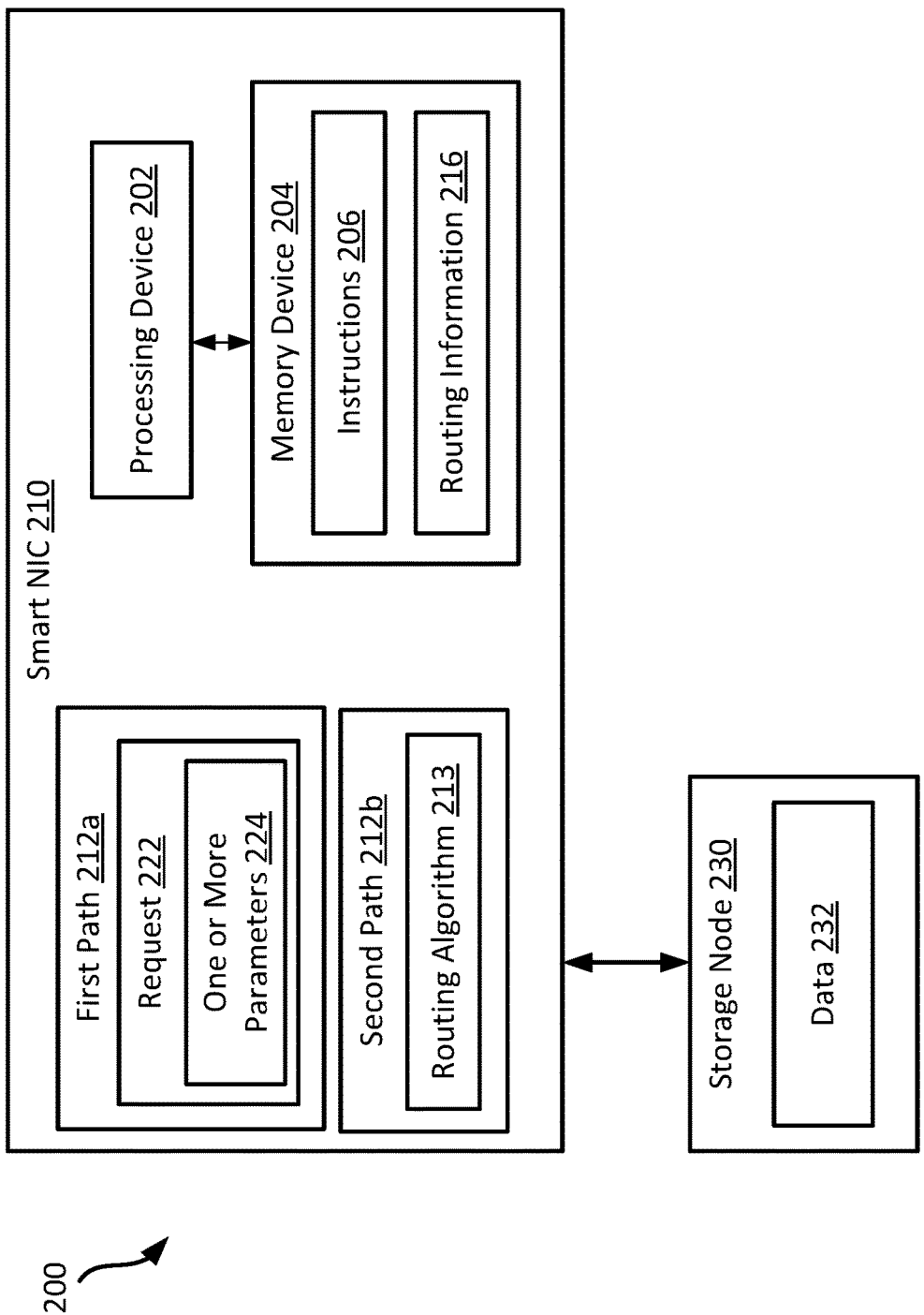
FIG. 2 is a block diagram of another example of system for implementing data request servicing using multiple paths of smart NICs according to some aspects of the present disclosure.

FIG. 2 is a block diagram of another example of a system 200 for implementing data request servicing using multiple paths of smart NICs according to some aspects of the present disclosure. The system 200 includes a smart NIC 210 and a storage node 230. The smart NIC 210 includes processing device 202, a memory device 204, a first path 212a, and a second path 212b. The first path 212a may be part of the processing device 202.

In this example, the processing device 202 is communicatively coupled with the memory device 204. The processing device 202 can include one processor or multiple processors. Non-limiting examples of the processing device 202 include a Field-Programmable Gate Array (FPGA), an application-specific integrated circuit (ASIC), a microprocessor, etc. The processing device 202 can execute instructions 206 stored in the memory device 204 to perform operations. The instructions 206 can include processor-specific instructions generated by a compiler or an interpreter from code written in any suitable computer-programming language, such as C, C++, C #, etc.

The memory device 204 can include one memory or multiple memories. Non-limiting examples of the memory device 204 can include electrically erasable and programmable read-only memory (EEPROM), flash memory, or any other type of non-volatile memory. At least some of the memory device 204 includes a non-transitory computer-readable medium from which the processing device 202 can read the instructions 206. The non-transitory computer-readable medium can include electronic, optical, magnetic, or other storage devices capable of providing the processing device 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206. Although not shown in FIG. 2, the storage node 230 and the management node 150 of FIG. 1 may also each include a processor communicatively coupled with a memory that stores instructions that are executable by the processors.

The processing device 202 can execute the instructions 206 to perform operations. For example, the processing device 202 receive a request 222 for data 232 at the first path 212 of the smart NIC 210. The first path 212a can be a hardware-implemented path. The processing device 202 can send one or more parameters 224 of the request 222 to the second path 212b of the smart NIC 210. The second path 212b can be a slower path than the first path 212a. The second path 212b can execute a routing algorithm 213 for the request 222. The routing algorithm 213 can determine routing information 216 for the request 222. The processing device 202 can receive the routing information 216 for the request 222 at the first path 212a from the second path 212b based on the routing algorithm 213. The processing device 202 can then transmit the request 222 to the storage node 230 based on the routing information 216. Since the second path 212b executes the routing algorithm 213, the determination of the routing information 216 can be accurate regardless of movement or other changes for the data 232 because the routing algorithm 213 is aware of the changes. So, the using both the first path 212a and the second path 212b to service data requests can be efficient and accurate. For instance, a queue of requests may allow the smart NIC 210 to service requests in wirespeed with minimal latency.

Figure 3:
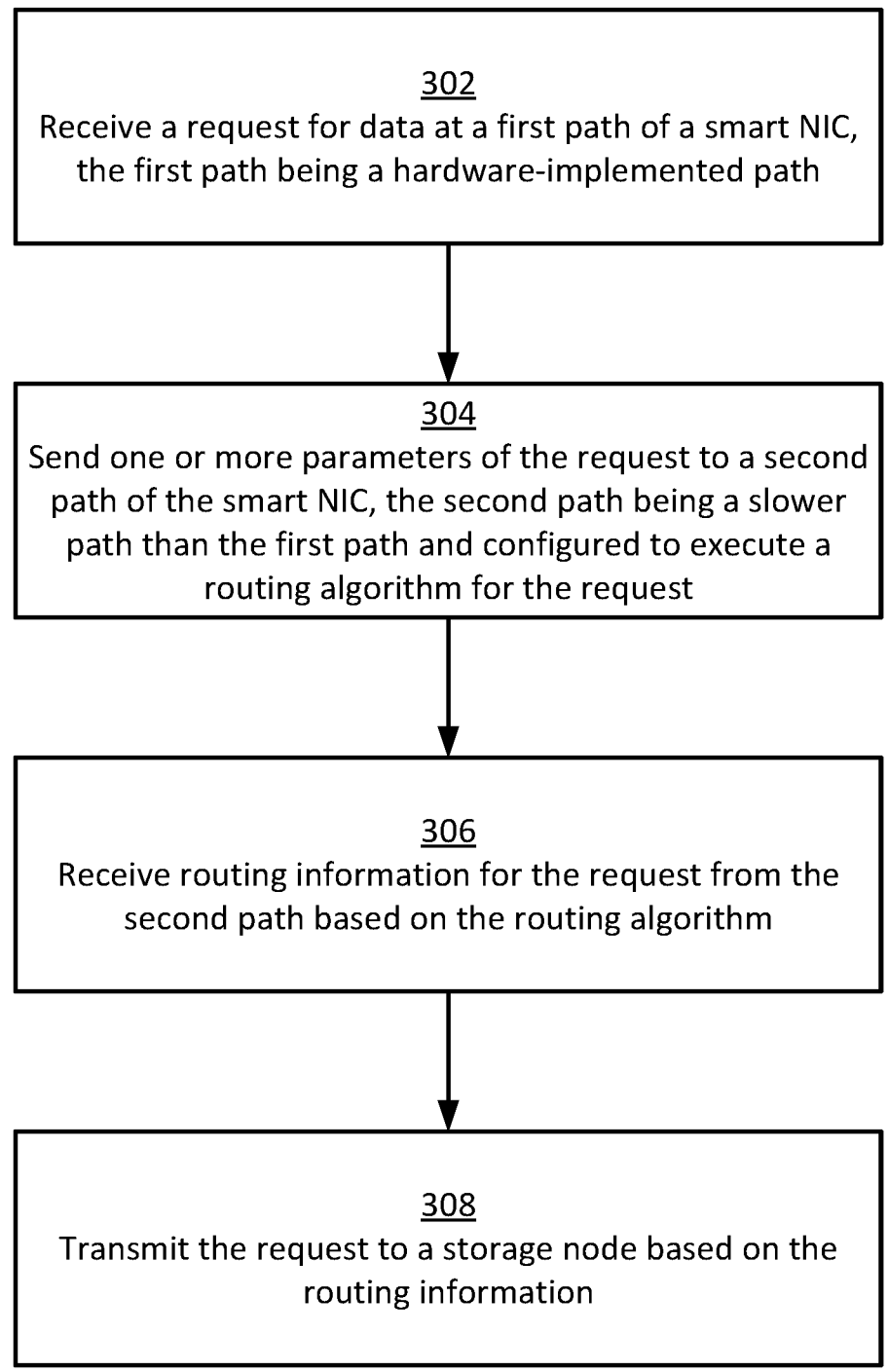
FIG. 3 is a flow chart of a process for servicing data requests using multiple paths of smart NICs according to some aspects of the present disclosure.

FIG. 3 is a flow chart of a process for servicing data requests using multiple paths of smart NICs according to some aspects of the present disclosure. The processing device 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processing device 202 can receive a request 222 for data 232 at a first path 212a of a smart NIC 210. The first path 212a can be a hardware-implemented path, such as a FPGA that is configured to execute simplified code in a shorter amount of time compared to an embedded processor of the smart NIC 210 that is capable of interacting with software to execute more complex code. The first path 212a may receive the request 222 from a queue that stores a plurality of requests from one or more client devices.

In block 304, the processing device 202 can send one or more parameters 224 of the request 222 to a second path 212b of the smart NIC 210. The smart NIC 210 can be a slower path than the first path 212a. For instance, the second path 212b may be an embedded processor that is capable of interacting with software to execute more complex code than the first path 212a. The first path 212a may send the one or more parameters 224 to a ring buffer that the second path 212b can access to receive the one or more parameters 224. The second path 212b can execute a routing algorithm 213 for the request 222. The routing algorithm 213 may be CRUSH or another suitable algorithm for determining routing information 216 with updated parameters for the request 222.

In block 306, the processing device 202 can receive the routing information 216 for the request 222 from the second path 212b based on the routing algorithm 213. The routing information 216 can indicate that a storage node 230 includes the data 232. Additionally, the routing information 216 may indicate that the data 232 is distributed across multiple storage nodes.

In block 308, the processing device 202 can transmit the request 222 to the storage node 230 based on the routing information 216. If the routing information 216 indicates that the storage node 230 includes a portion of the data 232 and that another storage node includes another portion of the data 232, the first path 212a may send the request 222 to both storage nodes. Alternatively, the first path 212a may only send the request 222 to the storage node 230, which can receive the request 222 and determine the storage node 230 and the other storage node each include a portion of the data 232. The storage node 230 can then generate a portion of the request for the portion of the data 232 that is stored on the other storage node and transmit the portion of the request to the other storage node. The storage node 230 and the other storage node can retrieve the respective portions of the data 232 in response to the request 222 and the portion of the request. Using the first path 212a and the second path 212b to route data requests may reduce a time and increase an accuracy for data retrieval, ultimately resulting in reduced usage of computing resources.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
receiving a request for data at a first path of a smart network interface card (NIC), the first path being a hardware-implemented path;
sending one or more parameters of the request to a second path of the smart NIC, the second path being a slower path than the first path and configured to execute a routing algorithm for the request;
receiving routing information for the request from the second path based on the routing algorithm; and
transmitting the request to a storage node based on the routing information.

2. The method of claim 1, wherein the storage node is a first storage node, and further comprising:
determining, based on the routing information, the first storage node includes a first portion of the data and a second storage node includes a second portion of the data; and
transmitting the request to the first storage node and the second storage node.

3. The method of claim 1, wherein the storage node is a first storage node, and further comprising transmitting the request to the first storage node for:
determining the first storage node includes a first portion of the data and a second storage node includes a second portion of the data;
generating, from the request, a first partial request for the first portion of the data and a second partial request for the second portion of the data; and
transmitting the second partial request to the second storage node.

4. The method of claim 1, further comprising transmitting the request to the storage node for:
subsequent to transmitting the request to the storage node, determining the storage node includes the data of the request; and
retrieving the data in the storage node.

5. The method of claim 1, further comprising:
receiving the request from a queue of a plurality of requests for data operations; and
sending the one or more parameters of the request to a ring buffer accessible by the second path of the smart NIC.

6. The method of claim 5, wherein the request is a first request and the routing information is first routing information, and further comprising:
performing, by the first path, a first operation associated with the first request substantially contemporaneously with a second operation for a second request, wherein the first operation comprises:
receiving the first request from the queue; and
sending the first request to the second path, and
wherein the second operation comprises:
receiving second routing information for the second request from the second path;
removing the second request from the queue; and
executing the second request based on the second routing information.

7. The method of claim 1, wherein the storage node maintains an association between each storage node and data stored on each storage node.

8. A non-transitory computer-readable medium comprising program code that is executable by a processor for causing the processor to:
receive a request for data at a first path of a smart network interface card (NIC), the first path being a hardware-implemented path;
send one or more parameters of the request to a second path of the smart NIC, the second path being a slower path than the first path and configured to execute a routing algorithm for the request;
receive routing information for the request from the second path based on the routing algorithm; and
transmit the request to a storage node based on the routing information.

9. The non-transitory computer-readable medium of claim 8, wherein the storage node is a first storage node, and further comprising program code executable by the processor for causing the processor to:
determine, based on the routing information, the first storage node includes a first portion of the data and a second storage node includes a second portion of the data; and
transmit the request to the first storage node and the second storage node.

10. The non-transitory computer-readable medium of claim 8, wherein the storage node is a first storage node, and further comprising program code executable by the processor for causing the processor to transmit the request to the first storage node for:
determining the first storage node includes a first portion of the data and a second storage node includes a second portion of the data;
generating, from the request, a first partial request for the first portion of the data and a second partial request for the second portion of the data; and
transmitting the second partial request to the second storage node.

11. The non-transitory computer-readable medium of claim 8, further comprising program code executable by the processor for causing the processor to transmit the request to the storage node for:
subsequent to transmitting the request to the storage node, determining the storage node includes the data of the request; and
retrieving the data in the storage node.

12. The non-transitory computer-readable medium of claim 8, further comprising program code executable by the processor to:
receive the request from a queue of a plurality of requests for data operations; and
send the one or more parameters of the request to a ring buffer accessible by the second path of the smart NIC.

13. The non-transitory computer-readable medium of claim 12, wherein the request is a first request and the routing information is first routing information, and further comprising program code executable by the processor for causing the processor to:

perform, by the first path, a first operation associated with the first request substantially contemporaneously with a second operation for a second request, wherein the first operation comprises:
receiving the first request from the queue; and
sending the first request to the second path, and
wherein the second operation comprises:
receiving second routing information for the second request from the second path;
removing the second request from the queue; and
executing the second request based on the second routing information.

14. The non-transitory computer-readable medium of claim 8, wherein the storage node maintains an association between each storage node and data stored on each storage node.

15. A system comprising:
a processing device; and
a memory device including instructions executable by the processing device for causing the processing device to:
receive a request for data at a first path of a smart network interface card (NIC), the first path being a hardware-implemented path;
send one or more parameters of the request to a second path of the smart NIC, the second path being a slower path than the first path and configured to execute a routing algorithm for the request;
receive routing information for the request from the second path based on the routing algorithm; and
transmit the request to a storage node based on the routing information.

16. The system of claim 15, wherein the storage node is a first storage node, and wherein the memory device further instructions executable by the processing device for causing the processing device to:
determine, based on the routing information, the first storage node includes a first portion of the data and a second storage node includes a second portion of the data; and
transmit the request to the first storage node and the second storage node.

17. The system of claim 15, wherein the storage node is a first storage node, and wherein the memory device further instructions executable by the processing device for causing the processing device to transmit the request to the first storage node for:
determining the first storage node includes a first portion of the data and a second storage node includes a second portion of the data;
generating, from the request, a first partial request for the first portion of the data and a second partial request for the second portion of the data; and
transmitting the second partial request to the second storage node.

18. The system of claim 15, wherein the memory device further instructions executable by the processing device for causing the processing device to transmit the request to the storage node for:
subsequent to transmitting the request to the storage node, determining the storage node includes the data of the request; and
retrieving the data in the storage node.

19. The system of claim 15, wherein the memory device further instructions executable by the processing device for causing the processing device to:
receive the request from a queue of a plurality of requests for data operations; and
send the one or more parameters of the request to a ring buffer accessible by the second path of the smart NIC.

20. The system of claim 19, wherein the request is a first request and the routing information is first routing information, and wherein the memory device further instructions executable by the processing device for causing the processing device to:
perform, by the first path, a first operation associated with the first request simultaneously with a second operation for a second request, wherein the first operation comprises:
receiving the first request from the queue; and
sending the first request to the second path,
and wherein the second operation comprises:
receiving second routing information for the second request from the second path;
removing the second request from the queue; and
executing the second request based on the second routing information.

* * * * *